3,429,838
ELASTOMERIC FOAMABLE ABLATION COMPOSITION
Harold R. Hersh, Cherry Hill, N.J., assignor to the United States of America as represented by the Secretary of the Air Force
No Drawing. Filed Feb. 11, 1966, Ser. No. 527,387
U.S. Cl. 260—2.5   1 Claim
Int. Cl. C08g 47/10, 53/08

ABSTRACT OF THE DISCLOSURE

A foamed ablative material useful as a heat shield for the aft end of re-entry vehicles comprising a room temperature vulcanizing silicone rubber, a blowing agent, a catalyst and a low temperature degrading, high gas evolving, powdered polymethylmethacrylate filler material.

---

This invention relates to elastomeric foam ablation materials and to an arrangement for the thermal protection of the aft end of re-entry vehicles.

The problem of providing proper thermal protection exists in many areas of scientific endeavor, especially in the field of space travel because of the extreme environmental conditions encountered during the re-entry regime of space vehicles. The nose cone of a missile or re-entry satellite often contains instruments that are particularly vulnerable to damage at elevated temperature. Consequently, providing these instruments with an adequate heat shield has become a problem of paramount importance. Heretofore, ceramic materials have been most often employed as a protective heat shield because of their excellent heat resistance. However, ceramic materials do not compensate for the difference in the thermal expansion characteristics of the insulated ceramic and the nose cone matrix. The internal stress resulting from the difference in thermal expansion is such that the outer insulating material will crack, thereby minimizing its insulation value.

Generally, the instrument package is positioned within the aft area of the nose cone. During the re-entry regime, the aft end of the nose cone encounters a lower shear force and heat flux environment than that encountered by the forward areas of the nose cone. Consequently, it was postulated that an ablative material possessing low density and low thermal conductivity could provide ample heat protection in a low shear, low heat flux environment such as that which exists in the area immediately adjacent to the aft end of a re-entry vehicle. In order for an ablative material to provide proper thermal protection, however, it would be desirable that it possess the folowing general properties: The ablative material should be of a low density and possess a low thermal conductivity and high specific heat in order to minimize the amount of material required for insulative purposes. It should likewise be capable of withstanding the storage environment and the high vacuum conditions of space without undergoing degradation. The material should also be readily processable and possess a controlled ablation temperature.

Accordingly, it is the primary object of this invention to produce an ablative material which will operate effectively as a heat shield for the aft end of a re-entry vehicle.

Another object of this invention is to provide an area for thermally protecting the instrument package contained within the nose cone of a re-entry vehicle.

The above and still further objects, advantages and features of this invention will become readily apparent upon consideration of the following description thereof.

In accordance with this invention, it has been found that the above stated objects can be accomplished by utilizing a foamed elastomeric ablative material as an aft heat shield cover for the nose cone of a re-entry vehicle. In general, the foamed elastomeric material consists of a room temperature vulcanizing silicon rubber, a blowing agent and a catalyst.

So that those skilled in the art may better understand the invention and the method by which the same may be carried into effect, the following examples, in which parts given are by weight, are presented to illustrate the principles involved.

Example 1.

Three thousand grams of silicone rubber and 900 grams of powdered polymethylmethacrylate were added to a four-gallon mixing pot which was affixed to a Readco paddle mixer. The polymethylmethacrylate molding powder was cooled to 35° F. before use. The composition was mixed at high speed for five minutes. Mixing was stopped and 600 grams of a blowing agent previously cooled to 35° F. was added. Mixing was started again at low speed for one minute and at a medium speed for an additional two minutes. The paddle was again stopped and 16.5 grams (13.2 mil) of stannous octoate catalyst was added to the mixture by means of a syringe. Mixing was initiated at high speed for 30 seconds and continued at medium speed for 30 seconds more.

The mixing pot was immediately removed from the Readco mixer and the contents poured onto an aluminum mold along its entire length. A Lucite doctor blade was used to draw down the mixture uniformly along the entire surface of the mold. A screen was then immediately clamped over the surface of the mold allowing the mixture to foam through the holes. The panel gelled within three minutes and was cured within one hour. The rubber mat was then removed from the mold by carefully slicing the mat from the under part of the screen.

The aluminum mold used in Example 1 was prepared as follows: aluminum shims (1" wide x 0.190" thick) were placed around the periphery of an aluminum plate (14.5 x 48 x 0.5") by means of dual fixed tape. The face of the mold was thoroughly cleaned with acetone. A 14.5 x 48 x 0.05" framed screen having 0.125" diameter folds on 0.1875" centers was cleaned in the same manner.

Example 2

|  | Parts |
|---|---|
| Silicone rubber | 100 |
| Silicone blowing agent | 20 |
| Stannous octoate catalyst | 0.75 |

Example 3

|  | |
|---|---|
| Silicone rubber | 100 |
| Silicone blowing agent | 20 |
| Stannous octoate catalyst | 0.75 |
| Filler (Lucite molding powder) | 30 |

Example 4

|  | |
|---|---|
| Silicone rubber | 100 |
| Silicone blowing agent | 20 |
| Stannous octoate catalyst | 0.75 |
| Filler (powdered polyethylene) | 30 |

Example 5

|  | |
|---|---|
| Silicone rubber | 100 |
| Silicone blowing agent | 20 |
| Stannous octoate catalyst | 0.75 |
| Filler (ammonium acetate) | 25 |

Example 6

|  | |
|---|---|
| Silicone rubber | 150 |
| Silicone blowing agent | 6 |
| Dibutyl tindilaurate | 0.3 |
| Filler (Phenolic microballoons) | 35 |

Example 1 discloses a foamed elastomeric ablative material suitable for use with the present invention together with a method for making the same. Examples 2 to 6 also disclose suitable ablative materials and are produced in the same manner as outlined in Example 1. The room temperature vulcanizing silicone rubber of Examples 1 to 6 is further described in U.S. Patent 2,843,555 to Berridge and is prepared in accordance with the procedure of Example 1 of that patent. The blowing agent of Examples 1 to 5 is a Trimethylsilyl chain-stopped dimethylpolysiloxane fluid as described in U.S. Patent 2,469,888 to Patnode while the blowing agent of Example 6 is a silicone fluid similar to that described in the above patent to Patnode but differing therefrom in that some of the silicon-bonded methyl groups have been replaced by silicon-bonded hydrogen atoms.

The utilization of filler materials, as disclosed in Examples 1 and 3 to 6, resulted from a theoretical consideration of the re-entry environment encountered by re-entry vehicles. The re-entry environment affecting the aft cover includes a low turbulent and laminar gas flow. These gases, which are evolved from the cover, will not be immediately swept away and as a result, provide a barrier through which the convective heat is transferred through conduction to the aft cover. Consequently, the inclusion of low temperature degrading materials which yield a high volume of gas can be employed as fillers in the low density, low thermal conductivity material contemplated by this invention. The fillers, when added to the room temperature vulcanizing silicon rubber, give low back wall temperatures during ablation and, when coupled with the low density, low thermal conductivity characteristics possessed by the foamed rubber, provides a much improved ablation material. The use of a filler provides a means controlling the ablation temperature as well as a means for upgrading the ablation performance of the foamed elastomer. Various filler materials may be employed such as Teflon, Kel F phenolic microballoons, ablative epoxides, ammonium sulfite, ammonium carbonate, nylon powder, cured phenolic powder, and mixtures thereof.

The ablative materials of this invention were subjected to an ablation screening test. This test was conducted in a low density arc tunnel. The conical nozzle of the arc tunnel was replaced by a rectangular nozzle. Two flat plate specimens were fitted to the rectangular nozzle forming a diverging section. Thermocouples situated in the back plate of each test specimen recorded the temperature rise at the backwall surfaces. The panels were exposed to an environment of approximately 5 B.t.u./ft.$^2$/sec. for a time period of 100 seconds. Backwall temperatures were recorded and the effective heats of ablation (Q) were calculated based on linear measurement of erosion. The results of ablation tests are described in Table I.

specific heat of the formulation set forth in Example 3. The tensile-stress strain characteristics were determined on an Instron Testing machine at a crosshead speed of a .05″/minute. The specimens were dumbbell-shaped and were tested at a strain rate of 0.01 inch/inch/minute. The tests were conducted at −10° F., room temperature and 170° F.

TABLE II

| Tensile Properties | | | | | | | | |
|---|---|---|---|---|---|---|---|---|
| (Ultimate Stress), p.s.i. | | | Ultimate Elong., percent | | | Modulus of Elasticity, p.s.i. | | |
| ° F. | | | ° F. | | | ° F. | | |
| −10 | RT | 170 | −10 | RT | 170 | −10 | RT | 170 |
| 88.2 ±1.0 | 63.6 ±4.2 | 58.1 ±2.8 | 66.4 ±1.8 | 60.0 ±1.7 | 53.6 ±3.2 | 133 | 105 | 108 |

| Shear Properties—Step Lap Shear | | |
|---|---|---|
| Three Specimens at Each Temperature Condition | 170° F. | −10° F. |
| Ultimate Strength (p.s.i.) | 21–32 | 130–139 |
| Ultimate Elongation (percent) | 31–47 | 122–140 |
| Modulus of Rigidity (p.s.i.) | 65–74 | 117–132 |

| Thermal Conductivity | | |
|---|---|---|
| Hot Temp., ° C. | Δ Temp., ° C. | B.t.u./(sec.)(of)(ft.$^2$/ft.) |
| 120.3 | 27.9 | 3.54×10$^{-5}$ |
| 81.4 | 26.3 | 3.64×10$^{-5}$ |

Coefficient of Expansion:
−35° F. to 74° F. _____ 125–10$^{-6}$ (in./in./° F.)
74° F. to 160° F. _____ 112–10$^{-6}$ (in./in./° F.)

Specific Heat:
194° F _____ 0.234 B.t.u./lb.
197° F _____ 0.236 B.t.u./lb.
203° F _____ 0.263 B.t.u./lb.

The tests set forth in Table I indicate that the foamed materials of this invention show relatively high heats of ablation and low backwall temperatures. The fillers were low temperature degrading, high gas evaluation materials acting as coolants. This indicates that the high gas evalution provides an effective thermal barrier and effectively decreases the convective heat transfer to the material proper. This effect is conspicuously demonstrated by the indicated high effective heat of ablation and low backwall temperature shown by the ammonium acetate filled foam. The hygroscopic nature of ammonium acetate, however, disqualifies it as a filler material; but, it does illustrate the effect of a high gas volume degrading filler.

The room temperature vulcanizing silicon rubbers of this invention are inherently difficult to bond to metal surfaces such as the nose cone of a re-entry vehicle. However, conventional adhesives such as a room temperature vulcanized silicon adhesive or a pressure sensitive adhesive have proved feasible in imparting a good bond between the compositions of this invention and an aluminum substrate over the temperature range −100° F. to

TABLE I.—ABLATION SCREENING TESTS RESULTS

| Formulation Material | Density, lbs./ft.$^3$ | Q B.t.u./l6 | ΔT ° F. after 100 sec. | Appearance of Residue |
|---|---|---|---|---|
| Foamed silicone with phenolic microballons filler | 47.7 | 3,700 | 98 | Slight char layer little erosion. |
| Solid silicone elastomer | 87 | 3,800 | 150 | Moderate char-blistered. |
| Foamed silicone with Lucite filler | 47 | 3,700 | 89 | Moderate char surface. |
| Foamed silicone with ammonium acetate filler | 47 | 5,000 | 85 | Very slight char on surface—very little erosion. |
| Foamed silicone with polyethylene filler | 47 | 4,400 | 112 | Heavy char and blistered char. |
| Foamed silicone elastomer | 46 | 4,600 | 140 | Heavy char blister. |

The results of the ablative screening tests indicate that the highest ablation performance (high heat of ablation and low thermal conductivity) is obtained with the Lucite filled silicone foam.

Table II presents the tensile properties, shear properties thermal conductivity, co-efficient of expansion and 500° F. A room temperature vulcanized silicon adhesive comprised of 55% silicone solids in acetone with vulcanization being attained on reaction with atmospheric moisture (20% R.H.) has proved especially feasible as has General Electric's SR–585 and Dow Cornings Silastic 140 pressure sensitive adhesive. Priming the metal substrate often insures a better bond between the metal and adhesive material.

While specific embodiments of the invention have been described with particularity, it will be evident to those skilled in the art that the invention is not limited thereto but that various modifications may be made without departing from the spirit and scope of the invention as defined by the appended claims.

What is claimed is:

1. An ablative material particularly adapted to provide heat protection to the aft-end of a re-entry vehicle nose cone consisting essentially of about 100 to 150 parts of a room-temperature vulcanizing silicone rubber, about 6 to 20 parts of a blowing agent, about 25 to 35 parts of powdered polymethyl methacrylate and about 0.3 to 0.75 part of a catalyst.

References Cited

UNITED STATES PATENTS

| | | | |
|---|---|---|---|
| 2,469,888 | 5/1949 | Patnode | 260—448.2 |
| 2,833,732 | 5/1958 | Weyer. | |
| 2,843,555 | 7/1958 | Berridge | 260—825 |
| 2,956,032 | 10/1960 | Joyce. | |
| 3,054,761 | 9/1962 | Moore et al. | |
| 3,070,555 | 12/1962 | Bruner. | |
| 3,127,363 | 3/1964 | Nitzsche et al. | |
| 3,271,332 | 9/1966 | Bond et al. | |
| 3,338,847 | 8/1967 | Nitzsche et al. | |

SAMUEL H. BLECH, *Primary Examiner.*

M. FOELAK, *Assistant Examiner.*

U.S. Cl. X.R.

156—79, 329; 260—827; 117—132; 161—207, 208